United States Patent [19]

Kraig

[11] 4,012,165
[45] Mar. 15, 1977

[54] FAN STRUCTURE

[75] Inventor: Alfred Henry Kraig, Simsbury, Conn.

[73] Assignee: United Technologies Corporation, Hartford, Conn.

[22] Filed: Dec. 8, 1975

[21] Appl. No.: 638,883

[52] U.S. Cl. .............................. 415/145; 415/181; 137/15.1; 60/226 R

[51] Int. Cl.[2] ........................................ F01D 17/00

[58] Field of Search ............ 60/226, 662; 415/181, 415/145, 144; 137/15.1, 15.2

[56] References Cited

UNITED STATES PATENTS

| | | | |
|---|---|---|---|
| 2,623,688 | 12/1952 | Davidson | 415/181 |
| 2,628,768 | 2/1953 | Kantrowitz | 415/181 |
| 2,689,681 | 9/1954 | Sabatiuk | 415/181 |
| 2,935,246 | 3/1960 | Roy | 415/181 |
| 2,966,028 | 12/1960 | Johnson et al. | 137/15.1 |
| 3,128,939 | 4/1964 | Szydlowski | 415/181 |
| 3,203,180 | 8/1965 | Price | 60/262 |
| 3,240,012 | 3/1966 | Price | 415/145 |
| 3,396,905 | 8/1968 | Johnson | 60/226 R |
| 3,494,539 | 2/1970 | Littleford | 60/226 R |
| 3,528,246 | 9/1970 | Fischer | 60/226 |
| 3,549,272 | 12/1970 | Bauger et al. | 416/166 |
| 3,611,724 | 10/1971 | Kutney | 60/226 |
| 3,638,428 | 2/1972 | Shipley et al. | 60/226 |
| 3,662,556 | 5/1972 | Poucher et al. | 60/226 |
| 3,735,593 | 5/1973 | Howell | 60/226 |

FOREIGN PATENTS OR APPLICATIONS

| | | | |
|---|---|---|---|
| 1,096,708 | 2/1955 | France | 415/145 |

*Primary Examiner*—Henry F. Raduazo
*Attorney, Agent, or Firm*—Robert C. Walker

[57] ABSTRACT

A fan structure which is particularly well suited for use in a high tip speed turbofan, gas turbine engine is disclosed. Various construction details accommodate both subsonic and supersonic flow across the fan blades. The system is built around compression shock wave phenomenon which are utilized to stably convert a portion of the dynamic energy of a supersonic stream to pressure energy within a subsonic stream.

3 Claims, 5 Drawing Figures

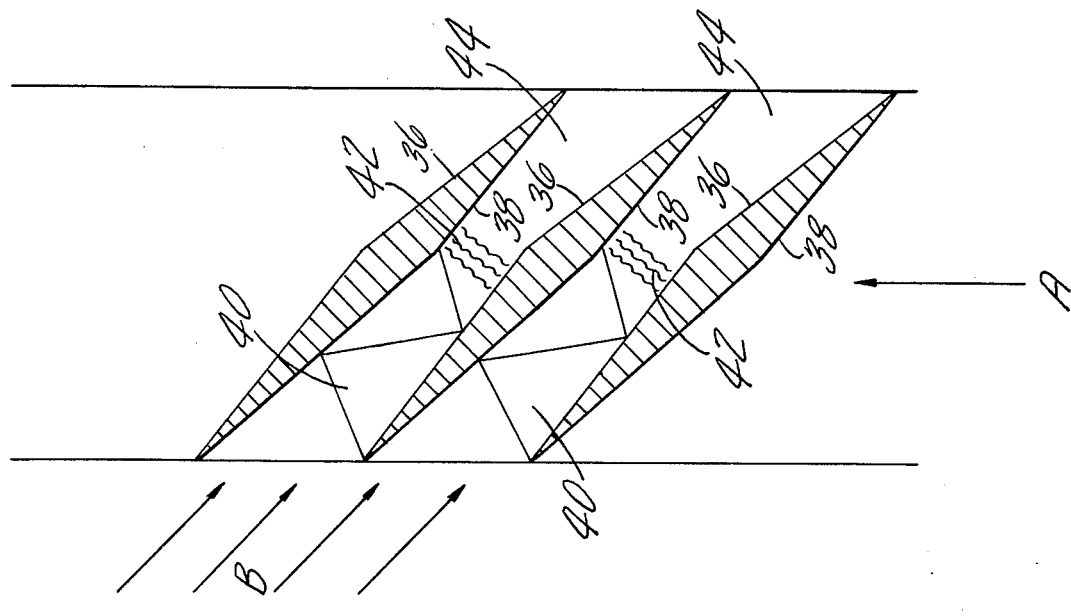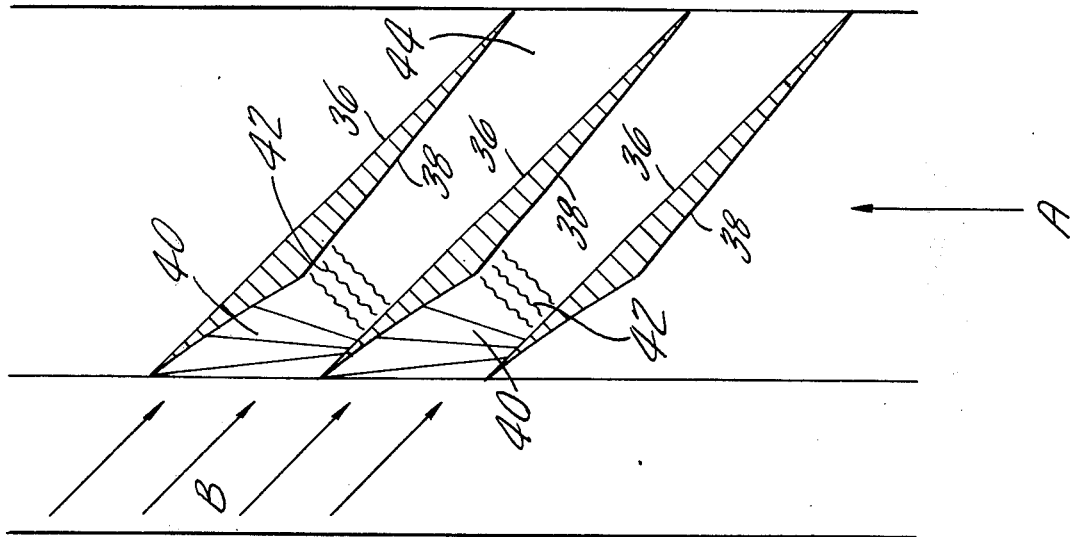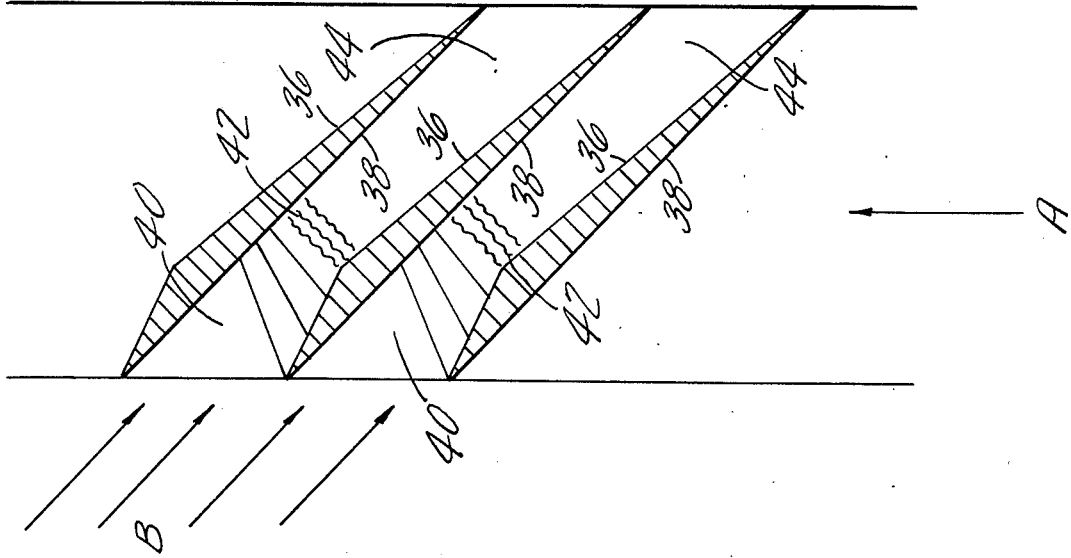

FAN STRUCTURE

BACKGROUND OF THE INVENTION

1. Field of the Invention

This invention relates to turbine engines and particularly to fan engines having high blade tip speeds.

2. Description of the Prior Art

The turbofan engine is the type of power plant most widely used on large aircraft today. In a conventional turbofan engine as distinguished from a turbojet engine, a portion of the working medium gases is pumped axially through one or more compression stages and is exhausted to the atmosphere without passing through the core engine. The compression stages which exhaust to the atmosphere are called fan stages and are generally positioned at the forward end of the engine. The ratio of the air flowing through the fan stages alone to the air flowing through the core engine is referred to as the bypass ratio. The bypass ratio may be a different value for each individual engine model according to the performance requirements of that power plant. In all turbofan engines, however, the fan stages make a substantial contribution to the total engine thrust at takeoff.

For large thrust contributions a bypass ratio of 5 or greater is typical. At these bypass ratios both the diameter of the fan passage and the speed of rotation of the fan are increased from conventional, lower bypass ratio engine values to pump the working medium at a sufficient flow rate. As the diameter of the fan and the speed of fan rotation are increased, the tip speed of each individual fan blade is correspondingly increased. The formula below expresses this relationship.

$$V_t = wr$$

where $V_t$ is the velocity of the tip;

$w$ is the angular velocity of the tip; and $r$ is the tip radius.

Wherever the blade speed causes the relative velocity of the approaching medium to be in excess of Mach 1.0, the dynamic energy of the supersonically approaching medium becomes converted to pressure energy by either gradual diffusion of the medium or by shock wave phenomenon. The term "subsonic and low supersonic" as applied throughout this specification to flows generally having relative approach velocities on the order of Mach 1.5 or less and the term "high supersonic" is applied to flows generally having relative approach velocities which are in excess of Mach 1.5.

In typical turbofan engines in commercial service today, the inward portion of each fan blade sees subsonic approach flow while the outward portion of each blade sees supersonic approach flow. In the outer portion of the blade a compression shock wave, commonly referred to as an "external wave," is established upstream of each blade leading edge. Across the external wave the velocity of the approaching medium is shocked from supersonic to subsonic regimes at a substantial energy loss. The greater the velocity differential across the external shock wave in an engine, the greater the loss becomes. At relative approach Mach numbers of 2 or greater, the shock wave loss is quite substantial and severe efficiency penalties are imposed against the operating engine.

A portion of the dynamic energy is converted across a shock wave to pressure energy and is recoverable in constructions capable of containing the shock wave within the rotating blades. A contained wave is most commonly referred to as an "internal wave" and has been previously proposed, by example, in U.S. Pat. No. 2,623,688 to Davidson entitled "Rotary Power Conversion Machine." Substantial aerodynamic flow losses occur in Davidson, however, as the working medium is forced through the shock wave region.

The designers of gas turbine engines are continually searching for apparatus which will reduce the severe shock wave energy losses commonly attendant in engines with high tip speed fans.

SUMMARY OF THE INVENTION

A primary aim of the present invention is to improve the operating efficiency of a turbofan, gas turbine engine having supersonic flow in the outer span region of the fan blades. A reduction in the shock wave energy losses at the outer span region is sought and, in one embodiment, a specific goal is to confine the shock wave to a constant area throat in the passage between adjacent fan blades. A reduction in aerodynamic pressure losses by controlling diffusion of the supersonically flowing medium upstream of the shock wave is a concurrent objective.

According to the present invention the flow path through the fan blades of a turbofan engine is segmented into a radially inward path for subsonic and low supersonic flow and a radially outward path for high supersonic flow, wherein the outward path includes an initial convergent region for deceleration of the approaching medium and a throat in which a normal shock wave is established during operation to convert the dynamic energy of the approaching supersonic medium to pressure energy within a subsonic stream.

A primary feature of the present invention is the segmented flow path through the fan blades. The contour of the blades in the radially inward region is conventionally adapted for subsonic and low supersonic flow and the contour of the blade in the radially outward region is adapted for high supersonic flow including a provision for a normal shock wave in the throat region thereof. A convergent zone is provided in the upstream region of the high supersonic passage between adjacent fan blades and, in one embodiment, a constant area throat region is provided immediately downstream of the convergent region. In one embodiment, starting and stabilizing doors oppose the tips of the fan blades to radially enclose the outward region. The doors are movable in response to engine operating conditions to vary the flow area of the outward region.

A primary advantage of the present invention is improved fan efficiency at high tip speeds. An internal compression geometry is incorporated within the outer region of the fan blades to increase the operating efficiency of the fan. Deceleration of the approaching medium in the upstream region of the fan blades reduces the strength of the normal shock, and correspondingly reduces the magnitude of the aerodynamic pressure losses imposed upon the flowing medium. Confinement of the shock wave to the region of minimum flow area within the passage minimizes the strength of the normal shock wave. Fan efficiency is optimized in one embodiment by starting and stabilizing doors which enable the confinement of the shock wave to the constant area throat.

The foregoing, and other objects, features and advantages of the present invention will become more apparent in the light of the following detailed description of the preferred embodiments thereof as shown in the accompanying drawing.

BRIEF DESCRIPTION OF THE DRAWING

FIG. 3 illustrates a convergent/divergent passage formed between adjacent fan blades;

FIG. 4 illustrates an alternate convergent/divergent passage formed between adjacent fan blades; and FIG. 5 illustrates an alternate convergent/divergent flow path formed between adjacent fan blades.

DESCRIPTION OF THE PREFERRED EMBODIMENT

Figure 1:
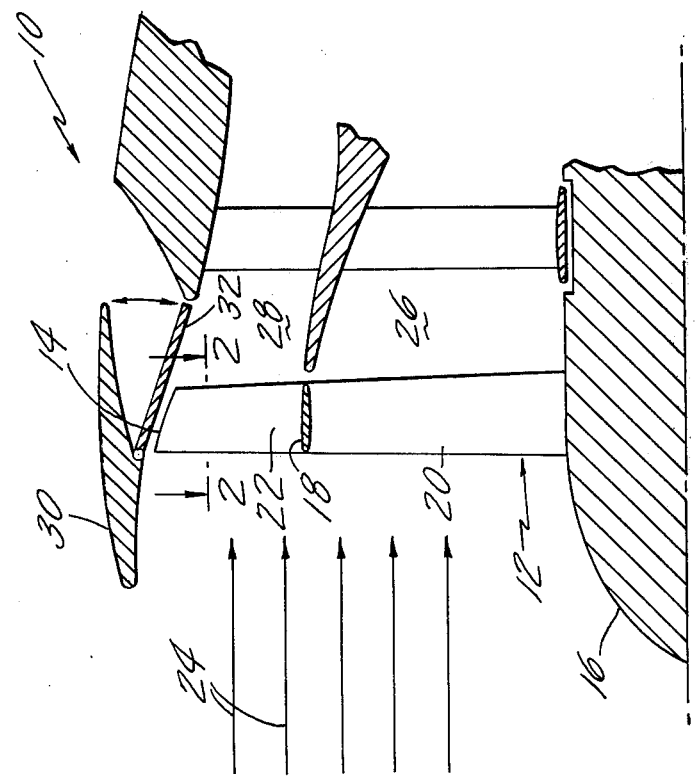
FIG. 1 is a simplified illustration of the fan section of a turbofan, gas turbine engine.

The fan section 10 of a turbofan, gas turbine engine is shown in the FIG. 1 simplified illustration. A fan blade 12 having a tip 14 extends radially outward from a rotor 16. The fan blade shown is representative of a plurality of blades which extend radially from the rotor at the same axial position. A mid span shroud 18 separates the blade into a radially inward region 20 and a radially outward region 22. The working medium 24 which approaches the fan section is divided by the shroud and is directed into a radially inward flow path 26 and a radially outward flow path 28. A fan case 30 radially surrounds the tips 14 of the blades 12 and has incorporated therein a starting and stabilizing door 32 which opposes the tips of the blades. The door 32 forms the outer wall of the flow path 28 and is moveable to vary the cross sectional area of the outward flow path.

Figure 2:
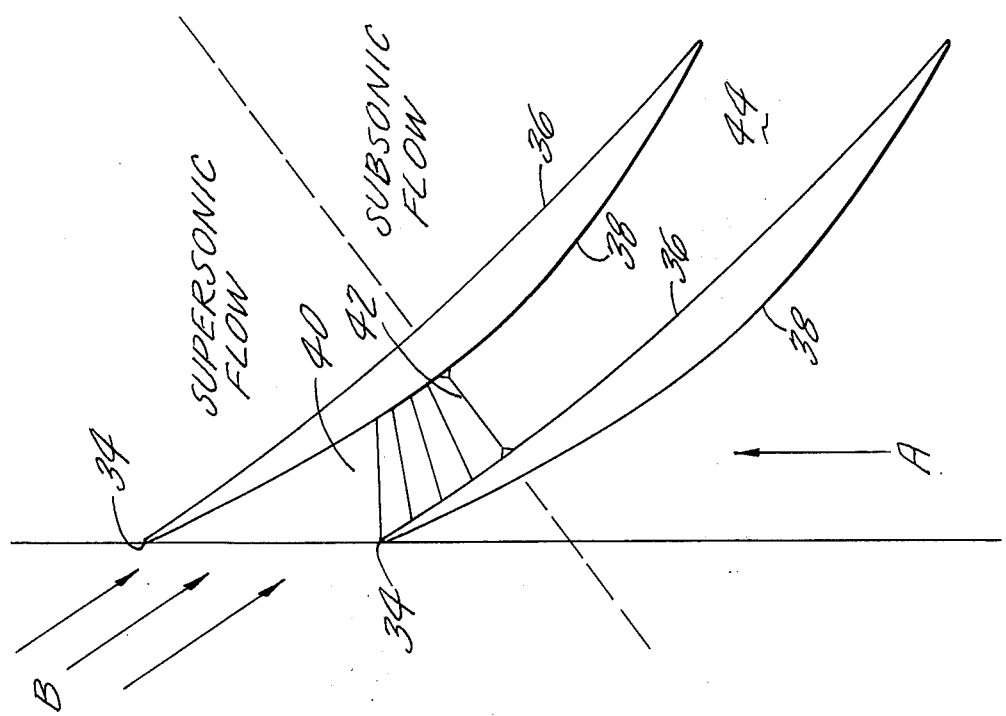
FIG. 2 is a sectional view taken along the line 2—2 as shown in FIG. 1 which illustrates the formation of a channel shock wave between adjacent fan blades.

The FIG. 2 sectional view of the outer region 22 shows a pair of adjacent fan blades each having a leading edge 34, a pressure wall 36, and a suction wall 38. A convergent passage 40 is formed at the upstream region of the blades between the suction wall of one blade and the opposing pressure wall of the adjacent blade. A throat 42 is formed downstream of the convergent passage at the location of minimum flow path area between the blades. A divergent passage 44 is located downstream of the throat. The direction of rotation A of the blades is shown and the direction of flow B of the approaching medium with respect to the rotating blades is illustrated.

During the operation of the engine an external shock wave is generated upstream of the leading edge of the fan blades at the outward flow path 28 as the local relative velocities of the approaching medium exceed Mach 1.0. As the approach velocities further increase the starting and stabilizing doors are opened to relieve a portion of the back pressure and cause the shock wave to be drawn downstream into the rotating fan blades. The rotating shock wave, sometimes referred to as an internal compression wave, is centered at the throat 42 between the adjacent blades and is held at that location by varying the position of the starting and stabilizing doors. In at least one embodiment the throat 42 comprises a constant area passage extending over a finite axial length between the blades. An increase in the length of the constant area throat improves the stability of the compression wave.

The starting and stabilizing doors are controlled by any of a number of control techniques sensing flow and/or pressure parameters. The doors shown provide a physical limit to the flow area although aerodynamic control of the flow area may be effectively implemented in some constructions.

The internal compression wave at the throat is a strong shock wave and, resultantly, produces a zone of unstable flow immediately adjacent thereto. Aerodynamic pressure losses are imposed upon the flowing medium as the medium flows through the unstable zone. Lower aerodynamic losses result as the velocity differential across the wave is diminished to reduce the strength of the shock wave. The apparatus of the present invention combines gradual diffusion of supersonic flow in the convergent passage 40 upstream of the throat 42 and internal compression wave phenomenon to obtain a maximized increase in pressure energy across the fan blades.

The general contour of the convergent passage 40 may be varied without departing from the concepts taught herein. For example, the passage 40 of one preferred construction illustrated by FIG. 5 is formed between a pressure wall 36 which converges with respect to the approaching flow and a suction wall 38 which also converges with respect to approaching flow. Weak oblique shocks produced in the converging region of the FIG. 5 apparatus gradually decelerate the working medium. As in all constructions, a strong passage shock occurs at the constant area throat 42 completing the transition from supersonic to subsonic flow and completing the conversion of supersonic dynamic energy to pressure energy. The subsonic medium is decelerated in the diverging passage 44 downstream of the throat to recover a substantial portion of the subsonic dynamic energy. Persons skilled in the art will recognize that additional airfoil contours which are capable of gradually diffusing the supersonic flow in an initial convergent region upstream of the throat are within the concepts taught therein.

Other convergent contours shown in this specification are capable of producing effective deceleration of the approaching medium. In the FIGS. 3 and 4 contours the pressure walls 36 or the suction walls 38 respectively converge upon the flowing medium in the passage 40 to produce weak shocks. Further tailoring of the walls, as illustrated by the concave initial region of the FIG. 4 pressure walls, decreases the strength of the weak shocks and may cause the flow to nearly approximate isentropic compression. The gradual deceleration of the supersonically flowing medium and a subsequent shock to subsonic velocities enables the apparatus disclosed herein to operate with reduced flow losses.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent of the United States is:

1. In a turbofan engine having a rotor which is mounted for rotation with respect to a stationary fan case, the improvement which comprises:
   a plurality of circumferentially spaced fan blades extending radially from the rotor toward the fan case wherein each fan blade has
   an inward region which is contoured for the conversion of dynamic energy within subsonic and low supersonic streams to pressure energy and an outward region which is contoured for the conversion of dynamic energy within a high supersonic stream to pressure energy within a subsonic stream and wherein said contour of the outward region is adapted to form between each pair of adjacent blades a convergent passage for the gradual deceleration of the supersonic stream and a throat downstream of the convergent passage for containment of a normal shock wave between adjacent blades;

a mid-span shroud positioned on each blade to separate said inward subsonic and low supersonic region from said outward high supersonic region; and at least one starting and stabilizing door in said stationary case which is radially opposes the fan blade tips and which is moveable with respect thereto to vary the area of the convergent passage and of the throat for positioning the shock wave at the throat.

2. The invention according to claim 1 wherein said throat is a substantially constant area passage.

3. The invention according to claim 1 in which said contour of the outer regions is further adapted to form a divergent passage downstream of said throat.

* * * * *